United States Patent
Faihe et al.

(10) Patent No.: US 7,926,031 B2
(45) Date of Patent: Apr. 12, 2011

(54) CONFIGURATION MANAGEMENT DATABASE AND SYSTEM

(75) Inventors: Yassine Faihe, Champagnier (FR);
Abdel Boulmakoul, Bristol (GB);
Mathias Salle, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 11/736,833

(22) Filed: Apr. 18, 2007

(65) Prior Publication Data

US 2008/0263084 A1 Oct. 23, 2008

(51) Int. Cl.
*G06F 9/44* (2006.01)
(52) U.S. Cl. .................. 717/121; 707/803; 707/804
(58) Field of Classification Search .................. 717/121; 707/803, 804
See application file for complete search history.

(56) References Cited

U.S. PATENT DOCUMENTS

| | | | |
|---|---|---|---|
| 2005/0125683 A1* | 6/2005 | Matsuyama et al. | 713/189 |
| 2006/0004875 A1 | 1/2006 | Baron | |
| 2007/0203952 A1* | 8/2007 | Baron et al. | 707/200 |
| 2008/0005186 A1* | 1/2008 | Ayachitula et al. | 707/200 |

OTHER PUBLICATIONS

Martin J; "CMDB Modeling" Internet Citation, Online, Jun. 6, 2006, pp. 1-2, XP002490175.
Ward C et al: "Fresco: A Web Services based Framework For Configuring Extensible SLA Management Systems", Jul. 11, 2005, pp. 237-245, XP010851802.

* cited by examiner

*Primary Examiner* — Wei Y Zhen
*Assistant Examiner* — Phillip H Nguyen

(57) ABSTRACT

A configuration management database (CMDB) comprising a plurality of statements, where in the statements comprise a first item identifying a resource, a second item identifying an object, and a third item identifying a relationship between the resource and the object, and wherein the statements are made in a markup language.

21 Claims, 2 Drawing Sheets

CONFIGURATION MANAGEMENT DATABASE AND SYSTEM

BACKGROUND TO THE INVENTION

A configuration management database (CMDB) for an information system describes the configuration items (CI) in the information system and the relationships between them. Configuration items can include, for example, data processing systems, routers, software and services. The configuration management database can be used, for example, to assess the impact of a change to the information system.

Existing CMDBs are generally constructed by defining a model for the information system using object oriented techniques and then implementing the model in a relational database, the CMDB. However, CMDBs and their models are generally difficult to extend and/or manipulate.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Figure 1:
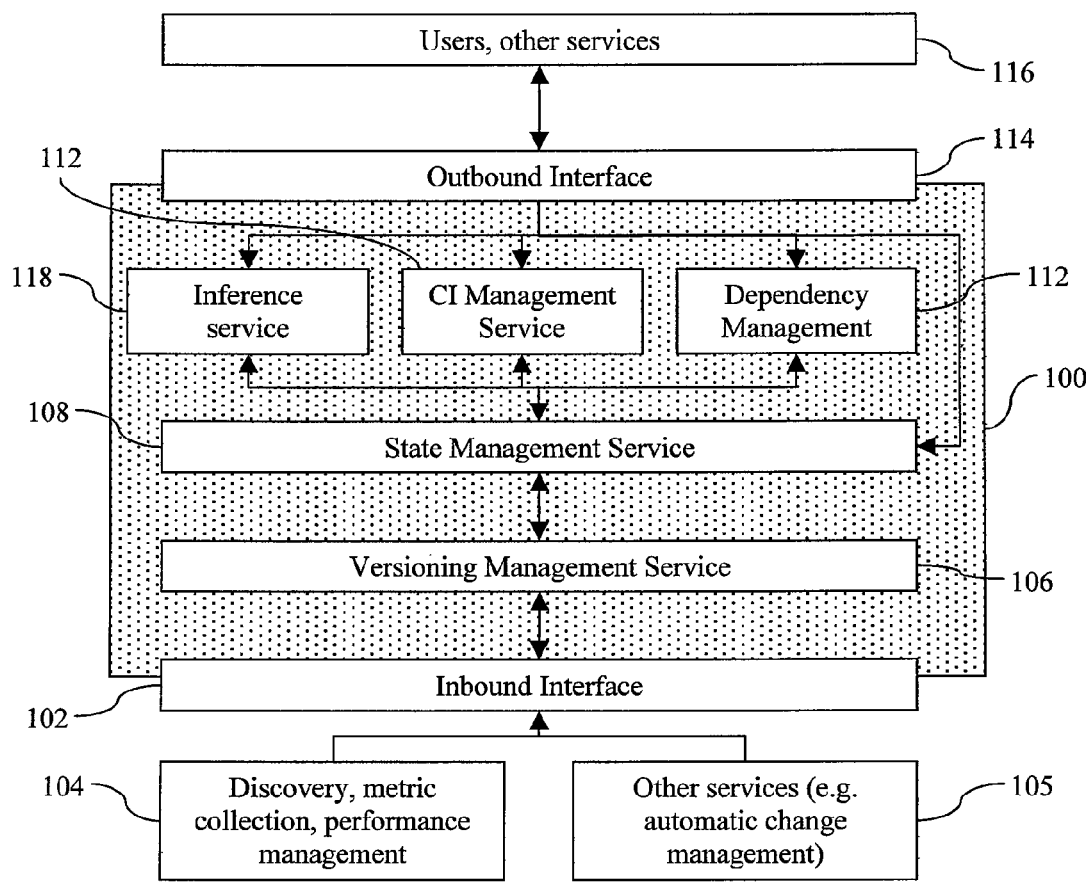
FIG. 1 shows an example of a configuration management database (CMDB) system according to an embodiment of the invention.

Embodiments of the invention comprise a configuration management database and system. The configuration management database comprises a plurality of statements made in a markup language. The statements identify a resource, an object, and a relationship between the resource and the object. Resources and/or objects may comprise configuration items such as, for example, data processing systems, routers, software applications, services and many other types of configuration items. The statements may also identify attributes of the resources and/or objects.

A markup language basically defines a set of tags and a syntax. The tags may surround or contain data, and may provide information about the data such as, for example, the type of data between the tags. A markup language is used to implement a CMDB according to embodiments of the invention that describes an information system. For example, statements that describe (or identify) relationships between resources and objects in the information system do not need to fit into a table in a relational database, for example. The statements can be more flexible than data in a relational database, and duplication of items (for example, statements) may not be required to fully describe the information system. Therefore, a CMDB according to embodiments of the invention that is implemented using a markup language is more flexible than a CMDB implemented using a relational database, and a CMDB and/or model of an information system described by the CMDB can be extended more easily than in the case where a relational database is used to implement the CMDB. Furthermore, a CMDB described using a relational database may be restricted in terms of the relationships between configuration items that can be defined, whereas the flexibility of a CMDB implemented using a markup language allows a more flexible approach to defining relationships between configuration items.

Examples of markup languages suitable for implementing embodiments of the invention include XML and semantic web formats. The semantic web is a format for web pages that are designed to be machine-readable. Semantic web formats are based upon markup languages and, in particular, Resource Description Framework (RDF). RDF can be used to make a collection of statements about resources, objects and the relationships between the resources and the objects. When used to describe a CMDB according to embodiments of the invention, the resources and objects may be, for example, configuration items (CIs) of an information system.

Other semantic web formats include, for example, RDF Schema (RDF) and Web Ontology Language (OWL). RDFS and OWL can be used to specify an ontology such as, for example, an information system, and can be used to specify hierarchical relationships between resources and/or objects in the ontology. Configuration items in an information database may have hierarchical relationships with each other. For example, software may be running on a data processor that is part of a data processing system that is part of a particular network of data processing systems. Semantic web formats such as, for example, RDFS and OWL are therefore particularly suited to describe an information system, in which configuration items have relationships with each other and have hierarchical relationships. Therefore, a CMDB may be implemented as a plurality of markup language statements, such as, for example, RDF statements, RDFS statements and/or OWL statements.

When using semantic web formats, tools can be used to manipulate the database. For example, SPARQL, a RDF query language, can be used to manipulate a CMDB implemented using RDF. Other query languages for RDF and other semantic web formats also exist and can be used with embodiments of the invention.

FIG. 1 shows an example of an architecture of a CMDB system 100 according to an embodiment of the invention. The CMDB system 100 includes an inbound interface 102 for receiving information on the information system (such as, for example, details of configuration items and/or relationships between them) from discovery 104 of the information system or from other services 105 (such as, for example, automatic change management). Discovery of the information system, that is, determination of the configuration items present in the information system and/or the relationships between them, can be effected automatically, manually, or both.

The CMDB system 100 also includes a versioning management service 106. The versioning service keeps track of the versions and status of certain configuration items in the information system. For example, a version 1.0 of a software configuration item may be being actively used within the information system. At the same time, maintenance of the version 1.0 of the software may be active, and development of a new version 2.0 of the software may also be active. These activities, and any software that arises from them, are kept distinct from the other versions of the software (such as, for example, version 1.0). The versioning management service 106 keeps track of the various versions of configuration items that are active and in development, and may also keep track of various states of a version of a configuration item, such as, for example, the states of in development, in testing, and in production.

The versioning management service 106 may also keep track of changes made to configuration items that are active and/or in development, or replacement of configuration items with alternative versions. Therefore, for example, any changes can be rolled back if necessary.

The CMDB system 100 includes a state management service 108. The state management service 108 keeps a record of the desired state of the information system and/or one or more configuration items, and compares the desired state with an actual state that is obtained, for example, through discovery 104. This can identify any discrepancies or inconsistencies between the actual state of the information system and the desired state. Action can be taken, for example to repair, restore and/or upgrade the information system, if any discrepancies are identified.

For example, the desired state of the information system may be provided by a system administrator or obtained from discovery of an information system that is in, or is assumed to be in, a desired state. The actual state may be obtained, for example, from discovery of the information system and/or monitoring of the information system. Details from the discovery or monitoring of the information system may be provided to the state management service 108, which updates or replaces a previous actual state (which may be out of date) with an updated actual state.

Figure 2:
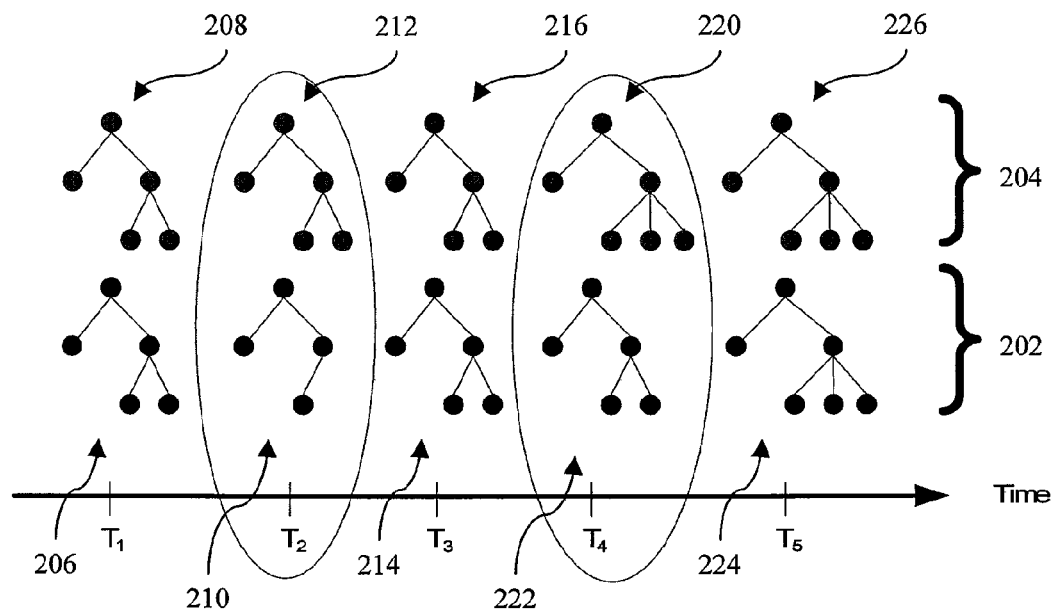
FIG. 2 shows an example of desired and actual states of an information system at various points in time.

FIG. 2 shows a graph 200 showing an example of actual states 202 and desired states 204 of an information system at various times. At a time $T_1$, the actual state 206 of an information system matches the desired state 208. At a time $T_2$, the actual state has changed, indicating that there has been a change in the information system. The change may be detected by, for example, discovery 104. There is therefore a discrepancy between the actual state 210 and the desired state 212, and this discrepancy can be detected by the state management service 108.

At a time $T_3$, the actual state 214 matches the desired state 216, indicating that the change has been reversed. For example, action has been taken to reverse or repair the change. At a time $T_4$, the desired state 220 has changed. Therefore, the actual state 222 no longer matches the desired state 220, and the discrepancies are identified by the state management service 108. At a time $T_5$, the actual state 224 has changed to match the desired state 226, indicating, for example, that action has been taken to change the information system to match the desired state.

This process of tracking the discrepancies between actual and desired states provides, for example, a facility to easily identify when parts of an information system do not conform to requirements and/or are not operating correctly.

The versioning management service 106 of the CMDB system 100 may also monitor the actual and desired states of versions of configuration items such as, for example, software configuration items. For example, a configuration item may be promoted from development to production if its actual state matches its desired state. Additionally or alternatively, determining the differences between the actual and the desired states can be used to keep track, for example, of the features to be added to a configuration item and/or the changes that need to be made to it.

The CMDB system 100 shown in FIG. 1 includes a configuration item (CI) management service 110 that is responsible for managing (for example, recording and/or monitoring) the configuration items, and a dependency management service 112 for managing the dependencies between configuration items. The CMDB system 100 also includes an outbound interface 114 for providing data to, for example, users, services in the information system and/or configuration items in the information system. The CMDB system also includes an inference service 118 that exploits the richness of the markup language CMDB representation to automatically derive/infer, for example, hidden relationships between configuration items and compatibility of configuration items for substitution based on constraints expressed in the ontology. The inference service 118 is an open system that allows a user to define their own algorithm in a plug and play fashion for processing (querying and/or changing) the CMDB, allowing customization specific to a particular situation. Examples of algorithms that a user may define within (or add to) the inference service 118 include algorithms to ensure semantic integrity of relationships between configuration items, spread a change across configuration items, perform queries (for example using SPARQL), analyze the risk and/or impact of a change in the CMDB and capture and apply best practices, where best practices are defined as one or more rules.

Configuration items may be defined in the CMDB. For example, a RDF schema can define configuration items using RDF. Below is an example of a RDF schema that defines a class CI for configuration items. Each CI can have one or of the properties Name, Location, Brand, SerialNumber and Status.

```
<rdfs:Class rdf:ID="CI">
    <rdfs:comment>Configuration Item Class</rdfs:comment>
    <rdfs:subClassOf rdf:resource="http://www.w3.org/1999/02/22-rdf-syntax-ns#Resource"/>
</rdfs:Class>
<rdfs:Property rdf:ID="Name">
<rdfs:range rdf:resource="rdfs:Literal"/>
    <rdfs:domain rdf:resource="#CI"/>
</rdfs:Property>
<rdfs:Property rdf:ID="Location">
    <rdfs:range rdf:resource="rdfs:Literal"/>
    <rdfs:domain rdf:resource="#CI"/>
</rdfs:Property>
<rdfs:Property rdf:ID="Brand">
    <rdfs:range rdf:resource="rdfs:Literal"/>
    <rdfs:domain rdf:resource="#CI"/>
</rdfs:Property>
<rdfs:Property rdf:ID="SerialNumber">
    <rdfs:range rdf:resource="rdfs:Literal"/>
    <rdfs:domain rdf:resource="#CI"/>
</rdfs:Property>
<rdfs:Property rdf:ID="Status">
    <rdfs:range rdf:resource="rdfs:Literal"/>
    <rdfs:domain rdf:resource="#CI"/>
</rdfs:Property>
```

The following RDF schema defines a server configuration item (CI). The server is defined as a configuration item (CI) having the name "HP 9000 server I", location Americas, brand HP, serial number 6799-234-66 and status "ok".

```
<cmdb:Server rdf:about="ServerSRVHP001">
    <cmdb:name>HP 9000 server I</cmdb:name>
    <cmdb:location>Americas</cmdb:location>
    <cmdb:brand>HP</cmdb:brand>
    <cmdb:serialnumber>6799-234-66</cmdb:serialnumber>
    <cmdb:status>ok</cmdb:status>
</cmdb:Server>
```

Relationships (dependencies) between configuration items may be defined in the CMDB. For example, a RDF schema can define dependencies using RDF. Below is an example of a RDF schema that defines a class "Depenedncy" for dependencies between configuration items. Each dependency can have one or of the properties dependent, antecedent and label.

```
<rdfs:Class rdf:ID="Dependency">
</rdfs:Class>
<rdfs:Property rdf:ID="dependent">
    <rdfs:range rdf:resource="#Dependency"/>
    <rdfs:domain rdf:resource="#CI"/>
</rdfs:Property>
<rdfs:Property rdf:ID="antecedent">
    <rdfs:range rdf:resource="#CI"/>
    <rdfs:domain rdf:resource="#Dependency"/>
</rdfs:Property>
<rdfs:Property rdf:ID="label">
    <rdfs:range rdf:resource="rdfs:Literal"/>
    <rdfs:domain rdf:resource="#Dependency"/>
</rdfs:Property>
```

The following RDF schema defines a dependency between a software server, with the configuration item Name property "MSOUTLOOK2000", and a hardware server, with the configuration item Name property "ServerSRVHP001".

```
<cmdb:Dependency>
    <cmdb:label>MSOUTLOOK2000-To-ServerSRVHP001</cmdb:label>
    <cmdb:dependent rdf:resource="MSOUTLOOK2000"/>
    <cmdb:antecedent rdf:resource="ServerSRVHP001"/>
</cmdb:Dependency>
```

Further configuration items and relationships between them may be defined using, for example, a RDF schema, or some other markup language, such as a semantic web format.

Figure 3:
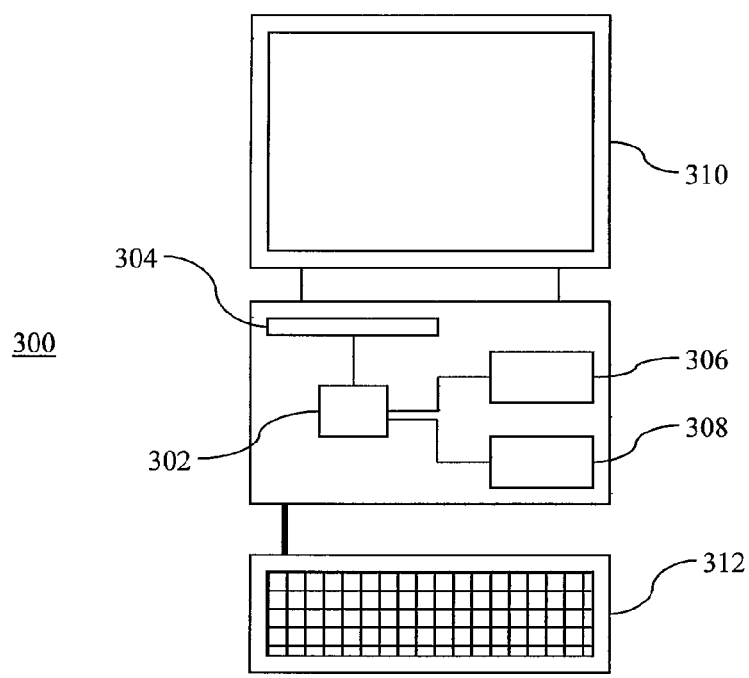
FIG. 3 shows an example of a data processing system suitable for implementing embodiments of the invention.

FIG. 3 shows an example of a data processing system 300 suitable for implementing embodiments of the invention, for example as a platform for executing an implementation of a CMDB and CMDB system. The data processing system 300 comprises a data processor 302 and a memory 304. The data processing system 300 may also include a permanent storage device 306, such as a hard disk, and/or a communications device 308 for communicating with a wired and/or wireless network such as, for example, a LAN, WAN, internet or other network. The data processing system may also include a display device 310 and/or an input device 312 such as, for example, a keyboard and/or mouse.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A Non-Transitory machine-readable medium storing a set of machine-readable instructions executable by the machine to implement a configuration management database (CMDB) comprising:
    a plurality of statements, wherein the statements comprise:
        a configuration item wherein the configuration item comprises a first item identifying a resource, a second item identifying an object, wherein the statements are made in a markup language;
        an ontology wherein the ontology comprises a set of defined constraints and relationships for the configuration item;
        a subset of instructions wherein the subset of instructions requests changing the CMDB by substituting configuration items;
        an inference service wherein the inference service uses the markup language and one or more constraints included in the ontology to infer relationships not explicitly defined between the plurality of statements;
        wherein the CMDB defines an actual state of an information system and a desired state of the information system, and the actual state and the desired state are comparable to reveal inconsistencies therebetween; and
        wherein the inference service analyzes the inconsistencies to create one or more rules for applying the requested substitution to the CMDB.

2. The Non-Transitory machine-readable medium as claimed in claim 1, wherein the plurality of statements comprise a plurality of Resource Description Framework (RDF) statements.

3. The Non-Transitory machine-readable medium as claimed in claim 1, wherein the statements are defined using a semantic web format.

4. The Non-Transitory machine-readable medium as claimed in claim 3, wherein the semantic web format comprises one of Resource Description Framework Schema (RDFS) and Web Otology Language (OWL).

5. The Non-Transitory machine-readable medium as claimed in claim 1, wherein the database comprises an actual state of an information system and a desired state of the information system.

6. The Non-Transitory machine-readable medium as claimed in claim 5, wherein the actual state and the desired state are comparable to reveal inconsistencies therebetween.

7. The Non-Transitory machine-readable medium as claimed in claim 1, wherein the statements include indications of versions of at least one resource.

8. The Non-Transitory machine-readable medium as claimed in claim 1, wherein the algorithm is a user-defined algorithm.

9. A configuration management system comprising:
a processor;
a memory coupled to the processor wherein the processor and the memory are configured for executing an implementation of a configuration management database (CMDB) comprising a plurality of statements, where in the statements comprise:
a configuration item wherein the configuration item comprises a first item identifying a resource, a second item identifying an object, and wherein the statements are made in a markup language;
an ontology wherein the ontology comprises a set of defined constraints and relationships for the configuration item;
a subset of instructions wherein the subset of instructions requests changing the CMDB by substituting configuration items;
an inference service wherein the inference service uses the markup language and one or more constraints in the ontology to infer relationships not explicitly defined between the plurality of statements;
wherein the CMDB defines an actual state of an information system and a desired state of the information system, and the actual state and the desired state are comparable to reveal inconsistencies therebetween; and
wherein the inference service analyzes the inconsistencies to create one or more rules for applying the requested substitution to the CMDB.

10. A configuration management system as claimed in claim 9, wherein the plurality of statements comprise a plurality of Resource Description Framework (RDF) statements.

11. A configuration management system as claimed in claim 9, wherein the statements are defined using a semantic web format.

12. A configuration management system as claimed in claim 11, wherein the semantic web format comprises one of Resource Description Framework Schema (RDFS) and Web Ontology Language (OWL).

13. A configuration management system as claimed in claim 9, wherein the subset of instructions comprises an algorithm.

14. A configuration management system comprising:
a processor;
a memory coupled to the processor wherein the processor and the memory are configured for executing an implementation of a configuration management database (CMDB) comprising a plurality of statements, wherein the statements comprise:
a first item identifying a resource,
a second item identifying an object,
a third item identifying a relationship between the resource and the object, wherein the statements are made in a markup language;
an ontology wherein the ontology comprises a set of defined constraints and relationships for the configuration item;
a subset of instructions wherein the subset of instructions requests changing the CMDB by substituting configuration items;
an inference service wherein the inference service uses the markup language and one or more constraints in the ontology to infer relationships not explicitly defined between the plurality of statements;
wherein the CMDB defines an actual state of an information system and a desired state of the information system, and the actual state and the desired state are comparable to reveal inconsistencies therebetween; and
wherein the inference service analyzes the inconsistencies to create one or more rules for applying the requested substitution to the CMDB.

15. A configuration management system as claimed in claim 9, wherein the statements include indications of versions of at least one resource.

16. A configuration management system as claimed in claim 14, wherein the subset of instructions comprises an algorithm.

17. A Non-Transitory machine-readable medium storing a set of instructions executable by a processor to implement a configuration management database (CMDB) comprising a plurality of statements, where in the statements comprise:
a configuration item wherein the configuration item comprises a first item identifying a resource, a second item identifying an object, and a third item identifying a relationship between the resource and the object, and wherein the statements are made in a markup language,
an ontology wherein the ontology comprises a set of defined constraints and relationships for the configuration item;
a subset of instructions wherein the subset of instructions requests changing the CMDB by substituting configuration items; and
an inference service wherein the inference service uses the markup language and one or more constraints in the ontology to infer relationships not explicitly defined between the plurality of statements;
wherein the configuration management database defines an actual state of an information system and a desired state of the information system, and the actual state and the desired state are comparable to reveal inconsistencies therebetween; and
wherein the inference service analyzes the inconsistencies to create one or more rules for the requested substitution to the CMDB.

18. The Non-Transitory machine-readable medium of claim 1, wherein the subset of instructions requests querying the CMDB.

19. The None-transitory machine-readable medium of 1, wherein the subset of instructions requests changing the CMDB by substituting configuration items and the inference service infers compatibility of configuration items for the requested substitution.

20. The configuration management database system of 9, wherein the inference service queries the CMDB, analyzes an impact of the request change, and determines one or more rules for applying the request substitution to the CMDB based on the impact.

21. The configuration management database system of 9, wherein the inference service uses the markup language and one or more constraints included in the ontology to infer compatibility of configuration items for the requested substitution.

* * * * *

UNITED STATES PATENT AND TRADEMARK OFFICE
CERTIFICATE OF CORRECTION

| | | |
|---|---|---|
| PATENT NO. | : 7,926,031 B2 | Page 1 of 1 |
| APPLICATION NO. | : 11/736833 | |
| DATED | : April 12, 2011 | |
| INVENTOR(S) | : Yassine Faihe et al. | |

It is certified that error appears in the above-identified patent and that said Letters Patent is hereby corrected as shown below:

In column 6, line 57, in Claim 4, delete "Otology" and insert -- Ontology --, therefor.

In column 7, line 9, in Claim 9, delete "where in" and insert -- wherein --, therefor.

In column 8, line 20, in Claim 17, delete "where in" and insert -- wherein --, therefor.

In column 8, line 47, in Claim 19, delete "None" and insert -- Non --, therefor.

In column 8, line 54, in Claim 20, delete "request change," and insert -- requested change, --, therefor.

Signed and Sealed this
Twenty-seventh Day of September, 2011

David J. Kappos
*Director of the United States Patent and Trademark Office*